United States Patent
Tucker

[15] 3,659,868
[45] May 2, 1972

[54] DETACHABLE WHEELS FOR BOATS
[72] Inventor: Eura Tucker, Santa Ana, Calif.
[73] Assignee: Dean Sandford, Orange, Calif. a part interest
[22] Filed: May 11, 1970
[21] Appl. No.: 36,319

[52] U.S. Cl. ............................................. 280/47.32, 9/1 T
[51] Int. Cl. ........................................................ B62b 1/10
[58] Field of Search ................ 280/47.13 A, 47.32, 414 A; 9/1 T

[56] References Cited

UNITED STATES PATENTS

| | | | |
|---|---|---|---|
| 2,339,782 | 1/1944 | Johnson | 280/47.32 UX |
| 2,709,084 | 5/1955 | Nagaishi | 280/47.32 |
| 3,098,245 | 7/1963 | Corey et al. | 280/414 A X |
| 2,115,864 | 5/1938 | Livermon | 280/414 A UX |
| 2,967,719 | 1/1971 | Williams | 280/414 A |
| 3,333,861 | 8/1967 | Hoffman | 280/47.32 |

Primary Examiner—Benjamin Hersh
Assistant Examiner—John A. Pekar
Attorney—Dean Sandford

[57] ABSTRACT

A wheel assembly and mounting brackets for removably attaching the assembly to a boat is disclosed. An upper and a lower mounting bracket are permanently attached in vertically spaced relationship at each side of the boat. A wheel assembly is removably attached to each of the sets of brackets to provide mobile support for the boat on land. The wheel assemblies are normally detached while the boat is in the water.

11 Claims, 10 Drawing Figures

Patented May 2, 1972

INVENTOR.
EURA TUCKER
BY
Dean Sandford
ATTORNEY

Patented May 2, 1972

INVENTOR.
EURA TUCKER
BY
Dean Sandford
ATTORNEY

DETACHABLE WHEELS FOR BOATS

This invention relates to detachable wheels for boats, and more particularly to boat wheels for removable attachment to a small boat so as to render the boat easily movable on land.

Trailer mounted boats can be easily launched and transported on land. However, many boats of smaller size are transported on car-top carriers, and in pickup trucks and station wagons. These boats, even though relatively small in size, are difficult to move from the vehicle to the water front, especially where the vehicle must be parked some distance from the shore.

While various types of detachable or folding wheels have heretofore been proposed to provide mobile support for a boat on land, the previously suggested attachments are either bulky and unwieldy to operate, prohibitively expensive, or do not provide stable support for the boat. Hence, need exists for a simple, inexpensive wheel assembly that can be readily attached to and detached from the boat.

Accordingly, a primary object of this invention is to provide a wheel assembly that is easily attached to and detached from a boat.

Another object of this invention is to provide a mounting device for easily and simply removably attaching a wheel assembly to a boat.

Still another object of the invention is to provide a detachable wheel assembly for small boats that can be quickly and easily attached to the boat while it is in the water, and that renders the boat easily movable on land.

Other objects and advantages of the invention will be apparent from the following description and accompanying drawings, wherein like numerals refer to like parts throughout, and in which.

Figure 1:
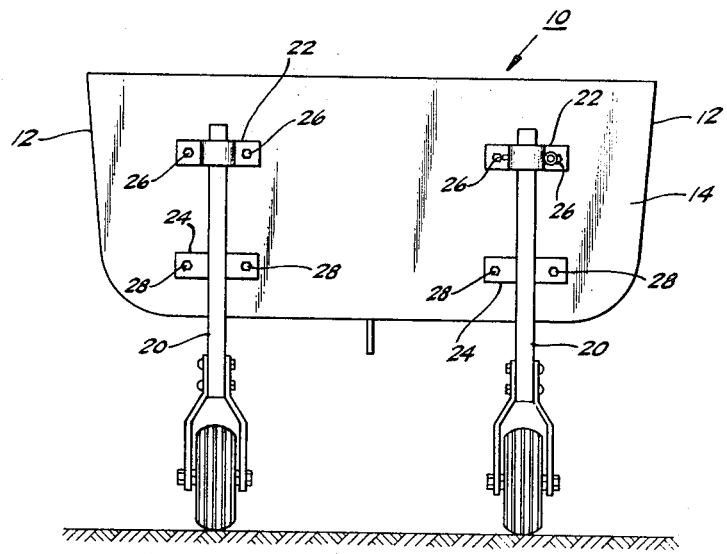
FIG. 1 is a rear elevation view of a boat having two of the wheel assemblies of this invention attached thereto.
Figure 2:
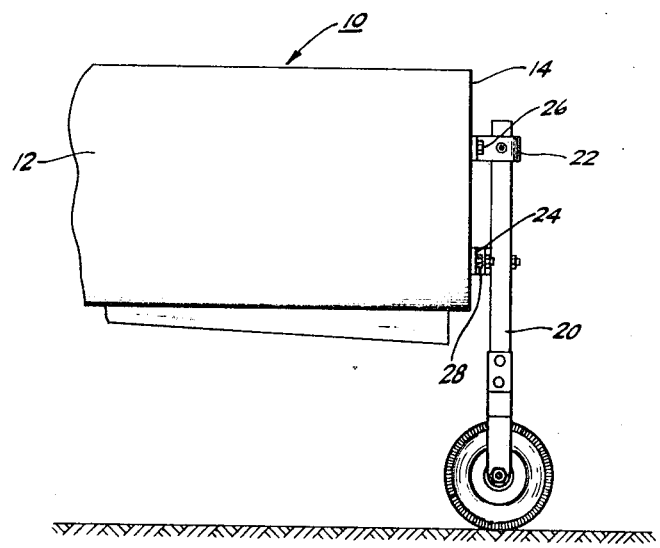
FIG. 2 is a side elevation view of the boat and attached wheel assemblies illustrated in FIG. 1.

Referring now specifically to FIGS. 1 and 2 of the drawings, reference numeral 10 generally refers to a boat having longitudinally extending sidewalls 12 and a transversely extending rear wall or transom 14. A pair of wheel assemblies 20 are attached to rear transom 14 in spaced relationship, one of the wheel assemblies being located at each side of the transom to provide stable support for the boat when on land, and leaving the center portion of the transom clear to mount a motor, such as an outboard motor, not illustrated in the drawing, in conventional manner.

Each of the wheel assemblies 20 is removably attached to the boat by means of an upper mounting bracket 22 and a lower mounting bracket 24 which are permanently attached in vertically spaced relationship to rear transom 14, so that wheel assembly 20 is supported in a substantially vertical position. Alternatively, brackets 22 and 24 can be attached in vertically spaced relationship to sidewalls 12, and one wheel assembly removably attached to the sidewall on each side of the boat, at or near the stern. However, since the rear transom of a boat is usually constructed of thicker material than the sidewalls to accommodate attachment of a motor, it is preferred that wheel assemblies 20 be mounted on rear transom 14, as illustrated in the drawings.

The rear transom of the boat, or alternatively, the sidewalls, are drilled and a pair of upper brackets 22 attached thereto by bolts 26, and a pair of lower brackets 24 attached in vertically spaced relationship by bolts 28. The bolt holes are caulked in conventional manner to maintain the hull water tight. Also, where the brackets are mounted on a sloping portion of the sidewall, or where the rear transom is inclined at a substantial angle from the vertical, a spacer, not shown, can be installed between each of lower brackets 24 and the sidewall or transom so that the wheel assemblies are supported in a substantially vertical position. Where the wheel assemblies are attached to the rear transom of the boat, they are preferably mounted sufficiently far apart to provide stable lateral support for the boat.

Figure 3:
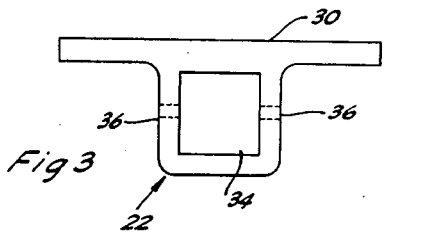
FIG. 3 is a top view of the upper mounting bracket for removably attaching the wheel assembly to the boat.
Figure 4:
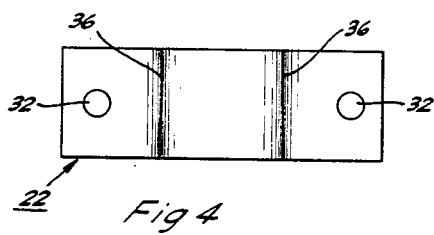
FIG. 4 is a front elevation view of the upper mounting bracket illustrated in FIG. 3.

As specifically illustrated in FIGS. 3 and 4, upper bracket 22 is an integrally cast metal member having a flat face 30 adapted to fit against the rear transom or sidewall of the boat, a pair of spaced apertures 32 adapted to receive bolts 26, and a vertical socket 34 adapted to receive the support shaft of the wheel assembly. Socket 34 has the same cross-sectional shape as the support shaft and a size only slightly larger than the shaft to permit the shaft to be readily inserted into the socket. Bracket 22 is longitudinally apertured at 36 to receive pin 66.

Figure 5:
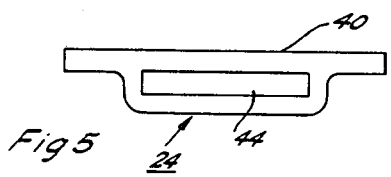
FIG. 5 is a top view of the lower mounting bracket for removably attaching the wheel assembly to the boat.
Figure 6:
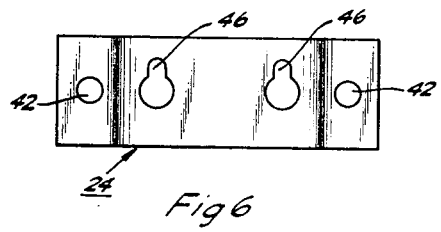
FIG. 6 is a front elevation view of the lower mounting bracket illustrated in FIG. 5.

Lower bracket 24 is also an integrally cast metal member. As specifically illustrated in FIGS. 5 and 6, the bracket has a flat face 40 adapted to engage the sidewall or rear transom of the boat, a pair of spaced apertures 42 adapted to receive bolts 28, a double wall construction defining a slot 44, and a pair of key shaped apertures 46 in the front wall of the slot.

Figure 8:
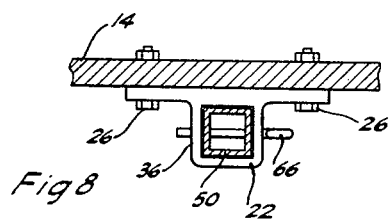
FIG. 8 is a horizontal sectional view taken along the line 8—8 of FIG. 7.
Figure 9:
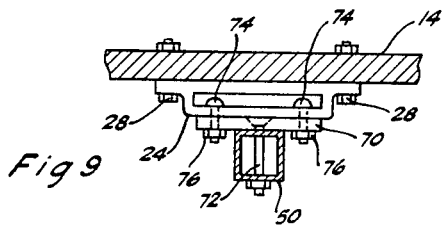
FIG. 9 is a horizontal sectional view taken along the line 9—9 of FIG. 7.
Figure 10:
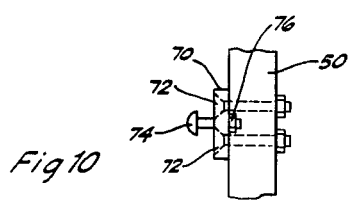
FIG. 10 is a partial side view of the wheel assembly showing the mounting base in detail.
Figure 7:
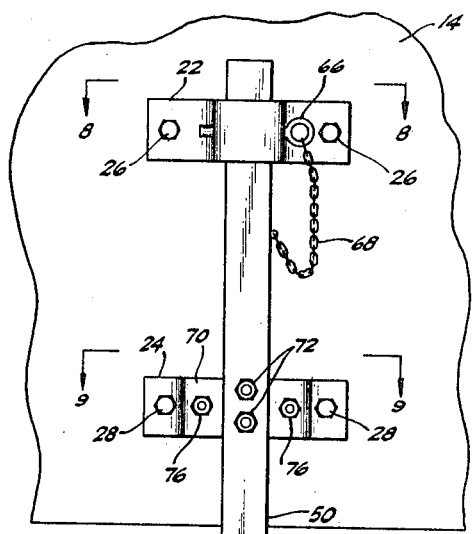
FIG. 7 is an elevation view of the wheel assembly of this invention showing the detail of its attachment to a boat.

FIGS. 7, 8 and 9 illustrate in detail the construction of the wheel assembly and its mode of attachment to the brackets 22 and 24. Wheel assembly 20 is comprised of leg or strut 50, preferably constructed of square tabular material; and a pair of shaped members 52 bolted to strut 50 by means of bolts 54, or alternatively welded thereto, to form a forked member to support wheel 56. Wheel 56 is rotatably mounted on axle 58, and is maintained thereon by washers 60, inner spacing nuts 62 and nuts 64. Wheel 56 includes a relatively wide tread tire that is preferably a pneumatic balloon tire. Pin 66 is attached to strut 50 or base plate 70 by chain 68, and is adapted for insertion through apertures 36 in bracket 22 and corresponding apertures in strut 50 to lock the wheel assembly in place.

Base plate 70 is attached to strut 50 by flathead bolts 72, a pair of vertically spaced holes being drilled and countersunk in the base plate to receive the bolts. A second pair of horizontally spaced holes are drilled in base plate 70 and tapped to receive the bolts 74. Bolts 74 are inserted into base plate 70 so that a portion of the shank of the bolt and the bolt heads project outwardly from the face of the base plate. The bolts 74 are secured in place by locking nuts 76.

In operation, wheel assemblies 20 are detached during normal operation of the boat, and are attached with the boat in the water immediately prior to landing. The wheel assemblies are quickly and easily attached to the boat by inserting strut 50 upwardly through socket 34, inserting bolts 74 through the large diameter portion of the apertures 46 in bracket 24, raising the wheel assembly slightly so that the shanks of bolts 74 move into the small diameter portion of apertures 46, and inserting pin 66 through aperture 36 in upper bracket 22 to lock the wheel assembly in place. With the wheel assemblies attached to the boat, the boat can be easily beached and maneuvered on land by merely lifting the front of the boat and towing or pushing it as desired. The bulk of the weight of the boat, particularly if the boat is equipped with a motor, is located near the stern of the boat and, thus, largely rests on the wheel assemblies. Also, the wheel assemblies can be readily attached to the boat on shore by lifting the back of the boat to provide sufficient clearance to attach the wheel assemblies.

Conversely, a boat equipped with the wheel assemblies of this invention can be easily launched. Once floating, the wheel assemblies are removed by withdrawing locking pins 66 from apertures 36, then pulling the lower portion of the wheel assembly away from the boat to withdraw bolts 74 from key apertures 46. The wheel assembly can then be pulled downwardly to withdraw the strut 50 from socket 34, thereby detaching the wheel assembly from the boat. The wheel assemblies can be conveniently stored in the boat or on shore until it is desired to reattach them to the boat. In the normal construction, the pneumatic balloon tires have sufficient buoyancy that the entire wheel assembly will float should it be dropped during the attachment or detachment operation.

Thus, it is proposed that small boats such as those transported on car-top carriers be provided with the foregoing mounting brackets and detachable wheel assemblies. Further, it can be readily seen that a number of small boats, such as might be involved in a resort or boat rental operation, can be provided with the mounting brackets of this invention, and the wheel assemblies moved from boat to boat as it is desired to beach a particular boat.

While various embodiments of the invention have been described, it will be obvious to those skilled in the art that it is not so limited, but is susceptible of various changes and modifications, which are considered within the spirit and scope of the invention as defined by the attached claims.

Having now described my invention, I claim:

1. A readily attachable and detachable wheel unit for boats, which comprises:
    a wheel assembly comprising an elongated strut terminating in a forked member, an axle mounted between the forks of said forked member, and a wheel rotatably mounted on said axle, said wheel including a pneumatic balloon tire that is of sufficiently large size to render the wheel assembly bouyant, and a base plate attached at an intermediate location on said strut, said base plate having a flat face from which a pair of bolt heads protrude;
    an upper mounting bracket for fixed attachment to the wall of said boat, said bracket comprising an integral member having a flat face for securing against the boat, a pair of spaced bolt holes, and a socket for detachably engaging the upper end of said strut, said socket and the upper end of said strut being apertured to receive a pin;
    a lower mounting bracket for fixed attachment to the wall of said boat, said bracket comprising an integral member having a first flat face for securing against said boat, a pair of spaced bolt holes, a second flat face for detachably engaging said base plate, said second face having a pair of key apertures, each of said key apertures having a relatively large diameter lower section and a relatively small diameter upper section, the lower larger diameter portion of said key receiving the head of said protruding bolts and the smaller diameter upper portion of said key receiving the shank of said bolt; and
    a pin insertable through the apertures in said socket and said strut, said pin being secured to the wheel assembly by a length of chain.

2. A readily attachable and detachable wheel unit for boats, which comprises:
    an upper mounting bracket for fixed attachment to the wall of a boat, said bracket comprising an integral member having a flat face for engaging the wall of the boat, a pair of spaced bolt holes, and a vertical socket open at the bottom for detachably receiving the top of a wheel supporting strut;
    a lower mounting bracket for fixed attachment to the wall of said boat, said bracket comprising an integral member having a first flat face for securing against said boat, a pair of spaced bolt holes, and a central vertical slot open at the bottom;
    a wheel assembly comprising an elongated strut terminating in a forked member, an axle mounted between said forks for rotatably supporting a wheel, and engaging means attached at an intermediate location on said strut and insertable into said vertical slot for detachably securing said strut to said lower mounting bracket; and
    locking means to lock said strut in said mounting brackets.

3. The apparatus defined in claim 2 wherein said socket and said strut are apertured to receive a pin, and wherein said locking means includes a pin insertable through said apertures.

4. The apparatus defined in claim 2 wherein said engaging means includes a base plate attached at an intermediate location on said strut, said base plate having a flat face from which a pair of lugs protrude, and wherein said lower mounting bracket includes a second flat face for engaging said base plate, said second face having a pair of apertures communicating with said central vertical slot for detachably inserting the lugs on said base plate into said central vertical slot.

5. The apparatus defined in claim 2 including a wheel rotatably mounted on said axle.

6. The apparatus defined in claim 5 wherein said wheel includes a pneumatic balloon tire that is of sufficiently large size to render the wheel assembly bouyant.

7. In combination:
    a boat;
    a pair of upper mounting brackets attached to the wall of said boat, one of said upper mounting brackets being attached at either side of the boat adjacent to its stern, each of said brackets comprising an integral member having a flat face for engaging the wall of said boat and a vertical socket for detachably receiving the upper end of a wheel supporting strut;
    a pair of lower mounting brackets attached to the wall of said boat, one of said lower mounting brackets being attached in vertically spaced relationship below each of said upper mounting brackets, each of said lower mounting brackets comprising an integral member having a first flat face for securing against said boat and a central vertical slot open at the bottom;
    a pair of wheel assemblies, each of said wheel assemblies comprising an elongated strut terminating in a forked member, an axle mounted between the forks of said forked member, a wheel rotatably mounted on said axle, and engaging means attached at an intermediate location on said strut and insertable into said vertical slot for detachably securing said strut to said lower mounting bracket, each of said wheel assemblies being readily attached to and detached from said upper and lower mounting brackets, the elongated struts being supported in a substantially vertical position when attached to said boat, said wheels projecting below the bottom of said boat to provide support for the boat on land; and
    means to lock said wheel assemblies in attachment to said boat.

8. The combination defined in claim 7 wherein said boat has a rear transom and wherein one of said upper and one of said lower mounting brackets are attached in vertically spaced relationship at either side of said transom.

9. The combination defined in claim 7 wherein each of said sockets and each of said struts is apertured to receive a pin, and wherein said means for locking said wheel assemblies in attachment to said boat includes a pin insertable through said apertures.

10. The combination defined in claim 7 wherein said wheel includes a pneumatic balloon tire.

11. The combination defined in claim 6 wherein the balloon tire is sufficiently large to render the wheel assembly buoyant.

* * * * *

UNITED STATES PATENT OFFICE
CERTIFICATE OF CORRECTION

Patent No. 3,659,868                     Dated May 2, 1972

Inventor(s) EURA TUCKER

It is certified that error appears in the above-identified patent and that said Letters Patent are hereby corrected as shown below:

Claim 11, line 1, "6" should be --- 10 ---.

Signed and sealed this 29th day of August 1972.

(SEAL)
Attest:

EDWARD M. FLETCHER, JR.                ROBERT GOTTSCHALK
Attesting Officer                       Commissioner of Patents